2,891,866
MANUFACTURE OF AN IMPROVED TEA PRODUCT

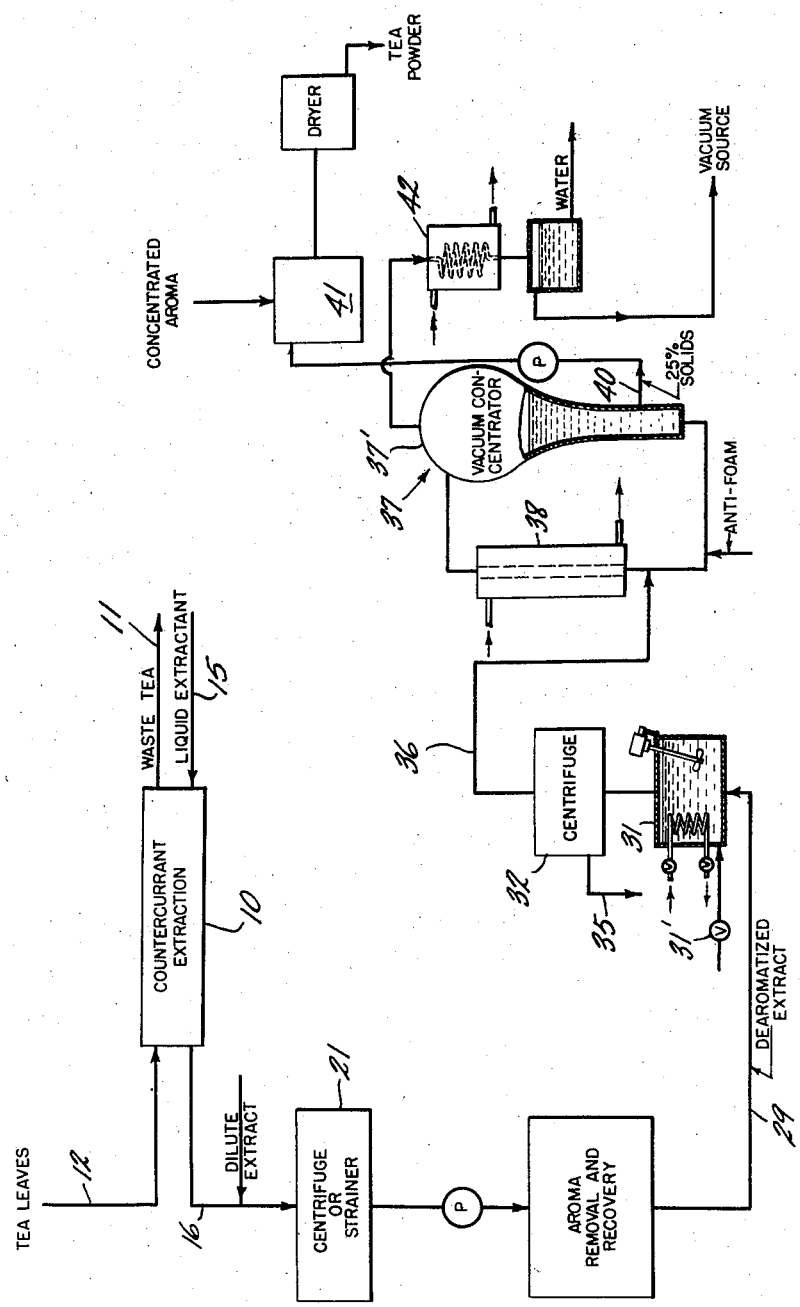
June 23, 1959  C. W. SCHROEDER  2,891,866
MANUFACTURE OF AN IMPROVED TEA PRODUCT
Filed June 4, 1956
INVENTOR.
CHARLES W. SCHROEDER
BY
his   ATTORNEYS United States Patent Office 2,891,866
Patented June 23, 1959

Charles W. Schroeder, Teaneck, N.J., assignor to Thomas J. Lipton, Inc., Hoboken, N.J., a corporation of Delaware Application June 4, 1956, Serial No. 589,182

12 Claims. (Cl. 99—77)

This invention relates to tea extracts, concentrates and powders and especially to those that may be reconstituted with hard water to produce a haze-free beverage.

"Soluble" tea powders already on the market have many disadvantages among which is that when they are dissolved in hard water to produce a beverage, even if the water is warm or hot, a haze may form in the solution causing the beverage to be less attractive to the consumer than beverages which are sparkling clear. The specific cause for the formation of such haze is not known, but it is known that the haze appears when the beverage stands for a period of time, often ½ to 3 hours, and may appear whether the tea is hot or cold.

One object of the invention is to treat tea extracts or derivatives thereof in such a way that the extracts or concentrates or dried powders prepared therefrom will not form a hazy or cloudy solution when diluted to beverage strength with hard water.

Another object is to carry out the treatment in a manner so that the flavor and color of the beverage are maintained.

Still another object is to produce a product which is free of the tendency to form a haze or cloud when mixed with hard water and also free of a tendency to form a precipitate or "cream" of less soluble tea solids at low temperatures of the order of those of cold beverage tea.

In practicing the invention, the tea leaves are steeped in a solvent, such as hot water, thereby to extract a large part of the soluble ingredients from the tea and produce a liquid extract which has a concentration of soluble tea solids substantially greater than in tea normally brewed for beverage consumption. The extract or a derivative thereof is treated with a calcium salt in an amount effective to produce a precipitate in the solution, followed by removal of the precipitate from the solution.

Tea leaves that have been processed and dried according to standard procedures may be used in practicing the invention. The tea leaves may be black or fully fermented varieties such as Ceylon, South India, or Indonesia, or mixtures thereof. Oolong or semi-fermented teas such as Formosa may be used. The leaves may be whole or comminuted, for example, even to a powder.

A hot water extraction of the tea leaves is carried out by countercurrent or continuous extraction procedures, multiple fresh water contacts or equivalent procedures to produce an extract preferably having a concentration of at least about 2.5% hot water-soluble solids. The concentration of soluble tea ingredients may be as high as saturation at the temperature prevailing in the extractor. The extract is then or after further processing treated with the calcium salt.

Different teas, depending upon their geographical origin, the type of growing season, the type of cultivation and other factors, will exhibit different tendencies to produce haziness or cloudiness in hard water. The amount of calcium salt required to make a product free of the tendency to produce haziness will vary among teas. In most cases, however, the required amount of calcium salt expressed as equivalent calcium will be at least about 0.3% of the total soluble tea solids in the solution or extract being treated. Amounts of calcium salt considerably in excess of that necessary to produce complete precipitation or insolubilization of the calcium-precipitable material may be used. However, there is no advantage in using such excessive quantities and accordingly, it is preferred that the amount of calcium salt be kept below the amount that is equivalent to about 1.0% calcium based on the tea solids. Depending upon the type of tea, the amount of precipitate formed and removed will be in the approximate range of 2 to 4%, again based on the total quantity of normally soluble tea solids.

The tea solution containing the calcium salt is held, preferably with mild agitation, until insoluble solids are precipitated and substantial equilibrium is reached. About one-half hour to three hours is generally sufficient for that purpose, but the holding time may be as much as 24 hours or longer.

The preferred method for separating the haze-forming precipitate from the tea extract is by centrifuging and Westfalia clarifier Model No. KDD604 has been found to be satisfactory. However, any other type of apparatus designed to remove suspended solids from a liquid may be employed. When the Westfalia clarifier is used, the liquid may be fed to it at the rate of 3 lbs. per minute (22.5 gallons per hr.). The centrifuge bowl holds 4.2 pounds and rotates at 10,000 r.p.m. It has an inside diameter of 6¼ inches, producing a maximum centrifugal force of 9,000 times gravity. It is preferred to operate the centrifuge so that there is no air space within the bowl nor an air gap at the bowl discharge. Such air spaces tend to interfere with the separation and to aerate the tea thereby causing deterioration of flavor and color.

One procedure for carrying out the process of the present invention is illustrated in the flow diagram attached hereto and designated Figure 1.

Reference number 10 indicates a counter-current extractor. Tea leaves are introduced to extractor 10 at 12 and the hot extractant is introduced at 15. The leaves are steeped in the extractant at an elevated temperature and for time to produce an extract having a concentration of at least about 2.5%. The extracted leaves are removed at 11.

The liquid withdrawn from extractor 10 through the pipe 16, designated as "Dilute Extract," may be passed through the strainer 21 to remove extraneous undissolved solid portions of the tea or other extraneous material, or may be centrifuged at elevated temperatures, e.g., about 140° F., for the same purpose. The dilute extract generally contains about 3½ to 5% soluble tea solids. The tea aroma along with some of the water may be removed by evaporation and the aroma concentrated in separate operations. The remaining de-aromatized extract may contain, for example, about 4 to 6% of soluble tea solids and is fed through the pipe 29 to the vessel 31, to which there is also added the desired amount of calcium salt through the valve 31', suitably in the form of an aqueous solution. The amount of calcium salt is sufficient to precipitate the material in the tea which would be susceptible to precipitation by hard water to produce a hazy tea beverage. It is then held in the vessel 31 (if desired at a temperature high enough to prevent the formation of a precipitate or "cream" of the less soluble tea solids as more fully described hereinafter) for time sufficient for the precipitate to form, after which it is passed on to the centrifuge 32, which is preferably of the type of the Westfalia clarifier described above and centrifuged at the desired temperature. Insoluble precipitate is periodically withdrawn at 35. The clear de-aromatized extract flows through the pipe 36 and into a vacuum concentrator 37, which may be of any generally known type intended for heat sensitive materials, suitably one in which liquid is heated in a tubular heater 38 and evaporation of liquid takes place in chamber 37'. It may operate, for example, at 26 to 29 inches of Hg vacuum and 150° F. to 100° F. effluent temperature. In place of the recirculating evaporator, a falling film evaporator with or without an internal agitator may be desirable, and single pass and/or multiple stages may be provided. The effluent of the concentrator 37 (concentrated extract) contains about 25 to 50% tea solids and flows through the pipe 40 to a vessel 41. The distillate (primarily water) is condensed in a water-cooled condenser 42 and withdrawn.

The concentrated aroma may be added to the concentrated extract in the vessel 41. The fluid in vessel 41 may be used as such to produce in hard water tea beverages free of cloudiness due to hardness. However, it is optional, according to the invention, to produce a dry powder by spray drying or other suitable methods.

In the procedure outlined in Figure 1, the calcium salt is added to the de-aromatized extract. However, the calcium salt treatment may be applied to other process material if desired, such as the dilute extract or the concentrated extract.

Following is an example of how the method of the invention may be carried out.

Example 1

A blend composed of one part of Ceylon black tea, one part of Java black tea and one part of South Indian black tea is extracted by a hot countercurrent extraction process. Fine insoluble material is removed by passing the extract through a centrifuge at a temperature of about 140° F., the dilute extract produced having about 4% soluble tea solids content. The dilute extract is then passed through a vacuum flash evaporator operated at a vacuum of 27 inches of mercury, and about 20% of the extract feed is removed as a dilute aroma vapor. The remaining 80%, dearomatized extract, which contains 4.9% soluble tea solids, is divided into two portions, i.e., a control, and a test portion subsequently to be treated with calcium chloride as hereinafter described. After the treatment with calcium chloride the extract is passed through a Westfalia KDD604 six-chamber centrifuge operating at 9000 r.c.f. at the rate of about 19 gallons per hour. Any precipitate produced by the treatment with calcium chloride is removed by the centrifuge, hence, the effluent is clear. The precipitated solids are removed from the centrifuge bowl by washing with distilled water, dried and weighed.

The dearomatized extract is heated to a temperature of 135° F. and to it is added 2.07 parts of calcium chloride per 100 parts of soluble tea solids in the extract. Calcium chloride is added as a 50% solution and the equivalent amount of calcium is 0.75% based on the soluble tea solids. The extract is then stirred briefly and allowed to stand in a steam jacketed kettle for 2 hours, after which time the temperature has dropped to 122° F. About half of the treated extract is withdrawn, stirred for 15 minutes, heated and centrifuged at 130° F. (average of inlet and outlet temperatures) through preheated bowls. The centrifugate is checked for haze formation by the procedure described below.

The remainder of the treated extract is allowed to stand for 20 hours at room temperature and is reheated to 135° F., stirred for 15 minutes and centrifuged through preheated bowls at 135° F. The new centrifugate contains 4.83% soluble solids. 4.53 parts of precipitate per 100 parts of soluble tea solids are recovered. Haze tests are carried out on the centrifugates and the control extract by diluting them to a concentration of 0.3% of soluble tea solids with boiling spring water (130 p.p.m. hardness). The development of haze in the diluted samples as they stand at room temperature is then observed and the results are summarized in the following table. The numbers in the table indicate increasing haziness from the value of 1 (very slightly hazy) to 10 (very cloudy).

| Time after Dilution | Control | Standing Time before Centrifuging | |
|---|---|---|---|
| | | 2 Hours | 20 Hours |
| Immediately | 1 | ½ | ½ |
| ½ Hour | 3 | 2 | 2 |
| 1 Hour | 8 | 3 | 3 |
| Cooled with ice | 10 | 4 | 4 |

The first observation is on the hot diluted samples immediately after dilution, the other observations are made after the samples have cooled to room temperature or below. Both of the calcium chloride treated samples are clear or almost clear immediately and reach the same degree of haziness after chilling. At this time the control sample contains a thick cloud. Thus the treatment of tea extracts with calcium salt and the allowance of sufficient time to form the precipitate prove to be effective in minimizing the formation of haze in tea beverages produced by diluting the extract with hard water.

In carrying out the process of the invention, the extract may be maintained at an elevated temperature in the interval between the time of addition of the calcium salt and the time of centrifuging, or it may be cooled in the interim, as described in Example 1. However, if such interval is prolonged, it is preferable to cool the extract to room temperature or below to prevent deterioration in the quality, e.g., the flavor of the tea.

Although the invention is not limited with respect to the temperature at which the treatment of the extract with calcium salt is effected, it may be convenient to remove the precipitate produced by the calcium salt at lower temperatures at which the less soluble components of the dissolved tea solids which would tend to produce cloudiness or "cream" in cold tea beverages are precipitated, and thereby carry out simultaneously both the process herein described and the process described in the application of Seltzer et al. Serial No. 554,533, filed December 21, 1955. The product of such a combined process will be free of any tendency to produce cloudiness caused by cooling, as well as that caused by water hardness. In this case the amount of solids removed due to "creaming" as specified in the Seltzer et al. application and the amount removed due to calcium salt precipitation will be cumulative. Such an operation fulfills one of the objects of the invention set forth above.

Referring to Figure 1, the combined operations of de-creaming and calcium salt treatment may be carried out in vessel 31 by maintaining the temperature of the extract therein below 100° F. to precipitate 5 to 25%, preferably 10–20%, of the dissolved tea solids from the cooling action alone, as described in the above-identified Seltzer et al. application, and separating the precipitated solids at such temperature. The calcium salt may be added through pipe and valve 31', so that it will become mixed with the fluid which is being subjected to de-creaming. The temperature at which the precipitate is removed is taken as the average of the inlet and outlet liquid temperatures at the centrifuge, which approaches the temperature of equilibrium between precipitated and dissolved solids. The precipitate removed periodically at 35 from the centrifuge 32 will include the material precipitated by the calcium salt and the material precipitated due to its insolubility at lower temperatures. In the operation in which the calcium salt is added to the dilute extract and the precipitate which forms is removed, the material that would have been precipitated in the vessel 31 will not be present, so that the precipitate later formed in vessel 31 due to cooling, and removed in centrifuge 32, will be composed only of the cold water insoluble components of the dissolved tea solids.

The following examples are presented as descriptions of procedures in which both the calcium salt treatment and the de-creaming process may be carried out simultaneously.

*Example 2*

50 grams of Ceylon black tea are extracted for 5 minutes with 400 ml. of distilled water starting at a temperature of 212 and decreasing to 184° F. The spent leaves are strained out and the resulting 225 ml. of extract is found to contain 3.8% of soluble tea solids. The still hot extract is separated into 25 ml. portions. To the first four portions amounts of a 1% solution of calcium chloride ($CaCl_2$) are added as follows: 0.5, 1.0, 1.5 and 2.0 ml. (0.19%, .38%, 0.57% and 0.76% calcium, respectively, based on dissolved tea solids). To a fifth portion which is the control, no calcium chloride is added. Precipitation takes place immediately in the samples to which calcium chloride is added. The samples are frozen overnight, then warmed to room temperature and swirled intermittently for an hour. They are filtered through Whatman #3 filter paper and all pass through at about the same rate. Each filtrate is diluted with seven volumes of water having calcium hardness of about 90 p.p.m. The control sample and that to which 0.5 ml. of calcium chloride solution had originally been added, begin to exhibit haze in about an hour and become cloudy after several hours. The sample treated with 1.0 ml. of calcium chloride becomes slightly hazy after several hours. The sample to which the larger amounts of calcium chloride have been added do not exhibit any cloudiness.

*Example 3*

A quantity of Ceylon black tea is extracted with hot tap water by a countercurrent method, and after removal of spent leaves yields about 40 lbs. of extract containing 4.2% tea solids. Before allowing the extract to cool it is divided into two parts, designated parts A and B. To portion A is added an amount of calcium chloride dihydrate ($CaCl_2$—$2H_2O$) equivalent to 1.5% of anhydrous salt on a soluble tea solids basis or 0.54% calcium on the same basis. No calcium chloride is added to portion B. The two portions are then cooled to 75° F., agitated one hour and centrifuged at 75° F. in a Westfalia clarifier Model No. KDD604 to remove the "cream" and the calcium precipitate, or the "cream" only. The clarified extracts are then evaporated to about 35% solids content, an amount of corn syrup solids equal to the tea solids is dissolved in them, and the solutions are spray dried.

Each of the powders obtained from parts A and B are divided again into two parts, A' and A" and B' and B", respectively. Samples A' and B' are dissolved at 45° F. in natural spring water having 140 p.p.m. hardness, and samples A" and B" in similar water at a temperature of about 100° F. The amounts of powder are sufficient to produce solutions of 0.3% tea solids content, which is approximately the strength of tea beverage as consumed. Both solutions A' and A" are clear, while both solutions B' and B" become hazy within about 15 minutes and are very cloudy within one to two hours. Portions A' and A", which have been treated with calcium chloride, do not have any detectable flavor change as compared with the untreated portion B, in the judgment of a professional tea taster.

*Example 4*

Twelve parts by weight of Ceylon tea leaves are extracted using countercurrent technique with water at 170 to 212° F. to produce an extract containing 3.9% soluble tea solids, which is about 87% of the total extractable solids present in the tea. The extract is strained to remove insoluble solids such as bits of leaf and foreign matter. The extract is fed while hot to a stripping still operated under a vacuum of at least 25" of mercury at a temperature of about 135° F., depending upon the vacuum. This is a single pass evaporator and the vapor produced, which is about 18.5 parts and is designated as dilute aroma, is withdrawn, concentrated and condensed.

The unvaporized liquid, amounting to about 80 parts and designated as de-aromatized extract, is withdrawn from the still through a pump. It contains about 4.8% soluble tea solids. To the dearomatized extract there is added 1.5% calcium chloride based on the amount of dissolved tea solids, which is equivalent to 0.54% calcium on the same basis. The calcium chloride is added to the extract and the calcium chloride treated extract is cooled to 75° F. according to procedures described in the previously mentioned copending application of Seltzer et al. to produce simultaneous creaming and precipitation of insoluble materials by the calcium salt per se. After the addition of the calcium chloride, the treated extract is held for about an hour in order to allow time for the precipitation to be completed and is then passed through a Westfalia clarifier Model No. KDD604 operated at 10,000 r.p.m. (9,000 r.c.f.). A clarified extract is removed from the centrifuge. The amount of cream and calcium precipitate retained in the centrifuge is about .8 to .85 part, equivalent to about 19 to 21% of the total soluble tea solids in the original extract, and there is withdrawn from the centrifuge 79 parts of de-creamed extract containing about 4.2% solids. The calcium chloride treated and clarified extract is then fed to a vacuum concentrator still operated under a vacuum of about 27" of mercury at 122° F. The amount of concentrated product recovered is about 13 parts and contains about 25% solids.

The concentrated aroma is mixed with the concentrated extract and to the mixture there is preferably added an amount of corn syrup solids equal to the solids in the extract, i.e., 3.3 parts, thereby to produce a solution of about 37% solids content. The latter is pre-heated and fed to the spray dryer, preferably at a temperature of 110 to 130° F. (pre-heated to this temperature if necessary). The inlet temperature of the dryer air is 438 to 441° F. and the outlet air temperature is 218 to 225° F. A powdered tea product is recovered, the amount thereof being substantially all that originally present in the dilute extract minus the amount removed in the centrifuging. The powdered tea product is readily soluble in hot or cold hard water and will not produce cloudiness upon standing. The tea beverages produced by dissolving the powder in water have acceptable color and flavor, of the order of that obtainable from tea made by infusion of the leaves.

*Example 5*

Separate extracts are prepared from two types of South India black tea (referred to herein as types A and B), a Ceylon black tea and a Java black tea by extracting 100 g. of each type of tea leaves with separate 800 cc. portions of boiling water for five minutes and then filtering the extract while hot. The amount of soluble tea solids in each of the extracts is determined and calculated amounts of 1.5% $CaCl_2$ solution are added to portions of the extracts at 120°–130° F. to supply 1.6% $CaCl_2$ (0.58% calcium) based on the amounts of soluble tea solids in each extract. The control samples are treated with equivalent amounts of distilled water. All of the samples then are stored overnight under refrigeration (40° F.), brought again to room temperature and filtered to remove precipitated cream and precipitate formed by the addition of the calcium chloride. The filtrates are analyzed for (1) total solids content, (2) color, and (3) haze formation after dilution with seven volumes of hard spring water (140 parts per million hardness) and after storage for one hour at room temperature. Observations of haze formation are also made after a further storage period in the refrigerator at 40° F. The procedure described is repeated using equivalent amounts (based on the calcium) of calcium acetate instead of calcium chloride for the treatment of the tea extracts. The results of the measurements and observations are presented in the following table:

| Tea | Solids in original extract, percent | CaCl₂ on tea solids basis, percent | Storage Temp. | Appearance | | |
|---|---|---|---|---|---|---|
| | | | | CaCl₂ | Ca(AC)₂ | Control |
| South India A | 4.31 | 1.39 | Rm. temp. | Clear | Clear | Cloudy. |
| | | | Refrig. | do | do | Do. |
| South India B | 4.12 | 1.45 | Rm. temp. | do | do | Do. |
| | | | Refrig. | Sl. hazy | do | Do. |
| Ceylon | 3.78 | 1.59 | Rm. temp. | Clear | do | Do. |
| | | | Refrig. | do | do | Do. |
| Java | 3.87 | 1.55 | Rm. temp. | do | do | Do. |
| | | | Refrig. | Hazy | do | Do. |

The samples prepared from the calcium chloride-treated extracts and the calcium acetate-treated extracts have a satisfactory color, comparable to that of the control samples.

*Example 6*

A portion of Sumatra Black tea is extracted with hot water and the suspended tea fines and sediment are removed by centrifugation. The clarified extract contains 4.93% soluble tea solids. A part of this solution (designated as sample 1 is reserved for testing of haze formation on dilution with hard water. The remainder is divided into two portion. The first portion is brought to a temperature of 75° F. and held at this temperature for one hour, while stirring slowly to produce "creaming" of a portion of the less soluble tea solids. It is then centrifuged according to the procedures prescribed in the preceding examples. A portion of the centrifugate (sample 2 is reserved for testing of its haze formation properties. The balance of the centrifugate from the first portion is brought to a temperature of 80° F. and 1.57% $CaCl_2$, on the tea solids basis is added thereto as a 6.8% aqueous solution. This is equivalent to 0.57% calcium on the same basis. The mixture is then slowly stirred at 80° F. for one hour. It is then centrifuged and a portion of the centrifugate (sample 3 is reserved for tests on haze formation. The amounts of solid material precipitated by the creaming and calcium chloride treatments are measured.

To the second portion of the clarified tea extract there is added 1.60% $CaCl_2$ (soluble tea solids basis), which is equivalent to 0.58% calcium. The mixture is held for one hour, stirring slowly at 75° F. to produce "creaming" of the less soluble components of the dissolved tea solids and is then centrifuged. A portion of the centrifugate (sample 4 is reserved for analysis. The amount of precipitate removed and recovered is measured. Tests on haze formation are carried out by diluting one part of the sample with seven parts of spring water having a hardness of about 140 p.p.m. The haze formation is evaluated in the same manner and using the scale as described in Example 1. The results of the measurements of haze formation and amounts of precipitates are presented in the following table:

| | Sample Number | | | |
|---|---|---|---|---|
| | 1 (Control) | 2 De-creamed only | 3 Separate Decreaming and CaCl₂ Treatment | 4 Simultaneous Decreaming and CaCl₂ Treatment |
| Precipitated Solids, Gms.[1] | 0 | 11.3 | 2.8 | 12.3 |
| Haze Formation Immediately | 8 | 8 | 0 | 0 |
| After 1 Hour | 10 | 10 | 1 | 1 |

[1] Based on 100 gms. of original dissolved tea solids.

In this specification there has been described what is believed to be the best mode of practicing the invention, but the invention is not confined to the embodiment shown. Although the use of calcium acetate and calcium chloride in the process of invention have been described, other calcium compounds which will dissolve in the solution of tea solids may be used, such as calcium carbonate, calcium sulfate and various calcium salts of organic acids. Hence, it is intended to cover by Letters Patent the invention as set forth in the appended claims.

I claim:

1. The method of reducing the tendency of a tea product to produce haziness when diluted to beverage strength with hard water, which comprises preparing an aqueous extract of tea leaves having soluble tea solids dissolved therein, treating said tea solids while in solution in concentration greater than beverage strength with a non-toxic calcium compound which dissolves therein, the amount of calcium compound being sufficient to produce a precipitate of a portion of said tea solids but insufficient to affect adversely the flavor of the tea solids, holding the so treated solution for a time to effect precipitation of a portion of said solids, and separating said precipitate to produce a substantially clear solution of tea solids having flavor comparable to beverage tea freshly prepared from the leaves.

2. The method of reducing the tendency of a tea product to produce haziness when diluted to beverage strength with hard water, which comprises preparing an aqueous extract of tea leaves having soluble tea solids dissolved therein, treating said tea solids while in solution in concentration greater than beverage strength with a non-toxic calcium salt which dissolves therein in an amount equivalent to an amount of calcium of at least about 0.3% based on said tea solids, the amount of calcium salt being insufficient to affect adversely the quality of the tea solids for beverage use, holding the so treated solution for a time to effect precipitation of a portion of said solids, and separating said precipitate to produce a substantially clear solution of tea solids which does not produce cloudiness when diluted to beverage strength with hard water at ordinary temperatures, said tea solids having flavor comparable to beverage tea freshly prepared from the leaves.

3. The method of reducing the tendency of a tea product to produce haziness when diluted to beverage strength with hard water, which comprises preparing an aqueous extract of tea leaves having soluble tea solids dissolved therein, treating said tea solids while in solution with a non-toxic calcium salt which dissolves therein an amount equivalent to an amount of calcium of at least about 0.3% based on said tea solids, the amount of calcium salt being insufficient to affect adversely the flavor of the tea solids, holding the so treated solution for a time to effect precipitation of a portion of said solids, separating said precipitate to produce a substantially clear solution of tea solids and separating at least a portion of the water associated with said tea solids to produce a tea product which is soluble in water and does not produce cloudiness when diluted to beverage strength with hard water at ordinary temperatures, said tea solids having flavor comparable to beverage tea freshly prepared from the leaves.

4. The method of claim 3 in which the tea solids concentration of the solution to which the calcium salt is added is at least about 2.5% by weight.

5. The process as described in claim 4 in which the holding and separating steps are carried out at a temperature below about 100° F. so as to produce "creaming" of tea solids which are insoluble at the prevailing temperature, and said "creamed" solids are separated from such solution, thereby producing a product which is completely soluble and does not produce cloudiness when reconstituted with cold hard water at beverage tea strength.

6. The process according to claim 3 in which a solution of said tea solids is cooled to a temperature low enough to produce "creaming" of tea solids which are insoluble at the prevailing temperature and said "creamed" solids are separated from such solution, thereby producing a product which is completely soluble and does not produce cloudiness when reconstituted with cold hard water at beverage tea strength.

7. The process according to claim 2 in which the amount of calcium salt is in the approximate range of 0.3 to 1.0% as expressed in terms of equivalent calcium.

8. The process according to claim 1 in which the precipiate is separated from the extract by centrifuging.

9. The process according to claim 1 in which the calcium compound is calcium chloride.

10. The method of reducing the tendency of a tea product to produce haziness when diluted to beverage strength with hard water, which comprises preparing an aqueous extract of tea leaves having soluble tea solids dissolved therein, treating said tea solids while in solution in concentration greater than beverage strength with a non-toxic calcium salt which dissolves therein, the amount of calcium salt being sufficient to produce a precipitate of a portion of said tea solids but insufficient to affect adversely the quality of the tea solids for beverage use, holding the so treated solution for a time to effect precipitation of a portion of said solids and separating said precipitate to produce a substantially clear solution of tea solids of a flavor, when diluted to beverage strength, comparable to beverage tea freshly prepared from the leaves.

11. The process according to claim 1 in which the amount of calcium compound is not greater than about 1.0% as expressed in terms of equivalent calcium.

12. The method of reducing the tendency of a tea product to produce haziness when diluted to beverage strength with hard water, which comprises preparing an aqueous extract of tea leaves having soluble tea solids dissolved therein, treating said tea solids while in solution with a non-toxic calcium compound which dissolves therein, the amount of calcium compound being sufficient to produce a precipitate of a portion of said tea solids but insufficient to affect adversely the flavor of the tea solids, holding the so treated solution for a time to effect precipitation of a portion of said solids, separating said precipitate to produce a substantially clear solution of tea solids and separating at least a portion of the water associated with said tea solids to produce a tea product which is soluble in water and does not produce cloudiness when diluted to beverage strength with hard water at ordinary temperatures, said tea solids having flavor comparable to beverage tea freshly prepared from the leaves.

References Cited in the file of this patent

UNITED STATES PATENTS

| 1,854,062 | Potter | Apr. 12, 1932 |
| 1,916,468 | Epstein | July 4, 1933 |
| 2,235,700 | Eldred | Mar. 18, 1941 |

FOREIGN PATENTS

| 403,868 | Great Britain | Jan. 4, 1934 |